United States Patent
Umehara

(10) Patent No.: US 8,165,238 B2
(45) Date of Patent: Apr. 24, 2012

(54) BI-DIRECTIONAL COMMUNICATION SYSTEM, COMMUNICATION APPARATUS, AND CONTROL METHOD OF COMMUNICATION APPARATUS

(75) Inventor: Makoto Umehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 12/562,343

(22) Filed: Sep. 18, 2009

(65) Prior Publication Data

US 2010/0086071 A1 Apr. 8, 2010

(30) Foreign Application Priority Data

Oct. 2, 2008 (JP) ................................ 2008-257789

(51) Int. Cl.
*H04L 27/28* (2006.01)
(52) U.S. Cl. ....................................................... 375/260
(58) Field of Classification Search .................. 375/260, 375/130, 295, 324; 370/345, 512, 520
See application file for complete search history.

(56) References Cited

U.S. PATENT DOCUMENTS

| 7,058,002 B1 * | 6/2006 | Kumagai et al. ............... 370/203 |
| 2008/0056393 A1 * | 3/2008 | Niu et al. ....................... 375/260 |
| 2009/0279572 A1 | 11/2009 | Takada et al. .................. 370/503 |

FOREIGN PATENT DOCUMENTS

JP 11-055211 A 2/1999

\* cited by examiner

*Primary Examiner* — Khai Tran
(74) *Attorney, Agent, or Firm* — Fitzpatrick, Cella, Harper & Scinto

(57) ABSTRACT

Each of two communication apparatuses in a bi-directional communication system transmits to a partner communication apparatus as an OFDM signal at a predetermined carrier frequency an OFDM symbol having a guard interval length determined in advance and an effective symbol length determined in advance; receives the OFDM signal that has been transmitted by the partner communication apparatus; and carries out demodulation processing on the received OFDM signal in a period that does not include a symbol boundary of the received OFDM signal. A transmission timing of an OFDM signal in at least one of these communication apparatuses is controlled to a timing that precedes a symbol timing of the received OFDM signal by a predetermined time shorter than a total of transmission times of the bi-directional OFDM signal in the bi-directional communication.

9 Claims, 11 Drawing Sheets

F I G. 13
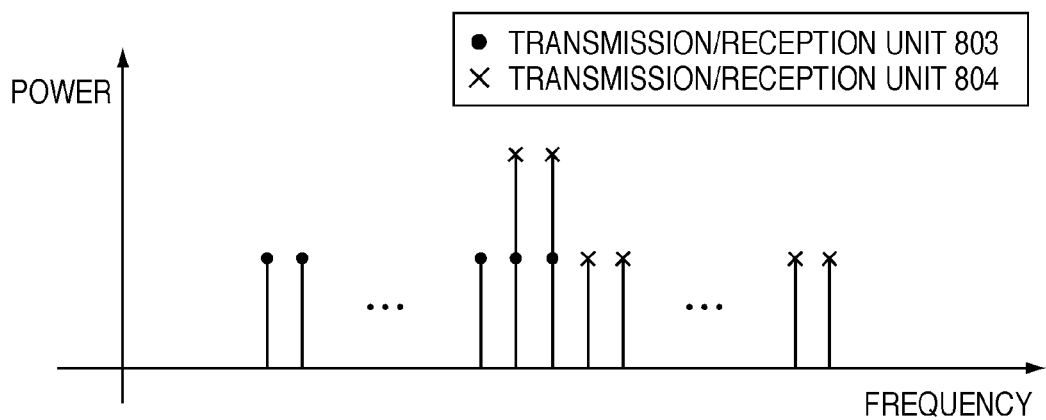
F I G. 14
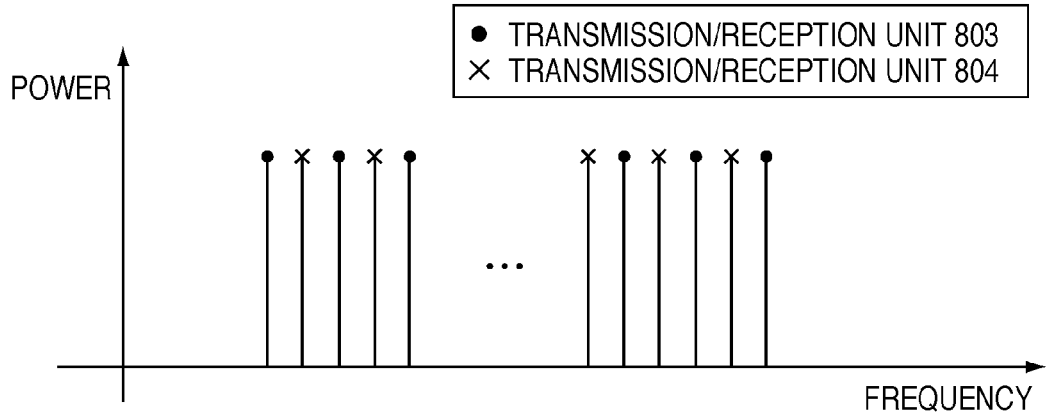

BI-DIRECTIONAL COMMUNICATION SYSTEM, COMMUNICATION APPARATUS, AND CONTROL METHOD OF COMMUNICATION APPARATUS

BACKGROUND OF THE INVENTION

1. Field of the Invention

The present invention relates to bi-directional communication systems that perform bi-directional communication of OFDM signals between opposing apparatuses using a predetermined transmission frequency band.

2. Description of the Related Art

In recent years, orthogonal frequency division multiplexing (OFDM) transmission formats have been applied in such areas as terrestrial digital television broadcasting. OFDM transmission formats involve transmitting transmission data at low speeds in parallel using multiple orthogonal sub-carriers, and therefore have characteristics such as multipath resistance and high efficiency in frequency usage.

Japanese Patent Laid-Open No. 11-055211 (hereinafter, patent document 1) describes a method in which bi-directional communication is performed between opposing apparatuses using an FDD (frequency division duplex) method on signals that have been modulated by the above-mentioned OFDM. Patent document 1 discloses a bi-directional communication method in which OFDM signals are transmitted in a reverse direction in synchronization with received OFDM signals. According to the transmission method described in patent document 1, the OFDM signals transmitted by each apparatus are orthogonal and the signals do not interfere with each other during reception demodulation. That is, by assigning frequency bands adjacent to each other, it is possible to expand the bi-directional transmission bandwidth.

However, no consideration is given in patent document 1 to the signal transmission times. For this reason, the following problems occur.

FIG. 8 is a block diagram of a bi-directional communication system according to patent document 1 in which a communication apparatus 801 and a communication apparatus 802 are provided with a transmission/reception unit 803 and a transmission/reception unit 804, and carry out bi-directional communication. It should be noted that the bandwidth of the communication frequency (sub-carrier frequency) used by the transmission/reception units 803 and 804 are assigned adjacent to each other as shown in FIG. 9. Furthermore, hybrid circuits or the like are not provided in the transmission/reception units 803 and 804, and in addition to being received by the transmission/reception unit 804 (803), the signals transmitted from a transmitter of the transmission/reception unit 803 (804) are fed back and received by a receiver of the transmission/reception unit 803 (804). Numeral 805 indicates a transmission channel. The transmission channel 805 is indicated using a solid line, however it is of no concern whether it is wired or wireless as a physical transmission channel. Numeral 806 indicates an OFDM signal that the transmission/reception unit 803 transmits to the transmission/reception unit 804 (hereinafter referred to as a downlink OFDM signal 806), and numeral 807 indicates an OFDM signal that the transmission/reception unit 804 transmits to the transmission/reception unit 803 (hereinafter referred to as an uplink OFDM signal 807).

In FIG. 10, numerals 1001 and 1002 indicate time assignments of the downlink OFDM signal 806 and the uplink OFDM signal 807 received by the transmission/reception units 803 and 804. It should be noted that although consideration is given in FIG. 10 to a transmission time Td of signals between the transmission/reception units 803 and 804, the transmission times of signals relating to the feedback are considered short enough to be ignorable. The transmission/reception units 803 and 804 transmit and receive OFDM symbols, which are constituted by an effective symbol and a guard interval (GI) in which a predetermined period of an end portion of the effective symbol is copied. The downlink OFDM signal 806 that is transmitted from the transmission/reception unit 803 is received by the transmission/reception unit 804 as the downlink OFDM signal 1005 after the transmission time Td from transmission, and is also fed back and received by the transmission/reception unit 803 (downlink OFDM signal 1003).

According to patent document 1, the transmission/reception unit 804 transmits the uplink OFDM signal 807 in synchronization with the downlink OFDM signal 1005. At this time, the uplink OFDM signal 807 that is transmitted from the transmission/reception unit 804 is received by the transmission/reception unit 803 as an uplink OFDM signal 1004 after the transmission time Td from transmission, and is also fed back and received by the transmission/reception unit 804 (uplink OFDM signal 1006). Here, in a case where the effective symbol period of the downlink OFDM signal 1005 of the transmission/reception unit 804 is used as a demodulation processing period (1007), the downlink OFDM signal 1005 and the uplink OFDM signal 1006 are orthogonal, and therefore the downlink OFDM signal 1005 can be demodulated without interference.

On the other hand, with the transmission/reception unit 803, the symbol timings of the downlink OFDM signal 1003 and the uplink OFDM signal 1004 have a time difference of 2Td, that is a round-trip transmission time, as indicated by numeral 1001. For this reason, in a case where the effective symbol period of the uplink OFDM signal 1004 of the transmission/reception unit 803 is used as a demodulation processing period (1008), a symbol boundary of the downlink OFDM signal 1003 is included, which impairs orthogonality. That is, problems are caused in that interference is produced and reception capabilities are reduced.

It should be noted that it is possible to maintain the orthogonality of both OFDM signals by setting the demodulation processing period for the transmission/reception unit 803 to precede (1009) the effective symbol period of the uplink OFDM signal 1004. However, patent document 1 has no description relating to such control of the periods of demodulation processing. Furthermore, when adjusting the demodulation processing periods in this manner, the period that functions as the GI in the received signals of the transmission/reception unit 803 becomes shorter compared to that of the received signals of the transmission/reception unit 804, which greatly reduces multipath resistance. Accordingly, there is a need to set the guard interval length (GI length) longer in order to avoid multipath interference in the transmission/reception unit 803, but in this case a problem is caused in that the bi-directional transmission bandwidth is reduced.

SUMMARY OF THE INVENTION

According to one embodiment of the present embodiment, a bi-directional communication system, a communication apparatus, and a control method of a communication apparatus are provided in which occurrences of interference are eliminated in bi-directional communication using OFDM signals, and that achieve bi-directional communication having high efficiency in frequency usage.

According to one aspect of the present invention, there is provided a bi-directional communication system that carries out bi-directional communication using OFDM signals, wherein each of two communication apparatuses comprise: a transmission unit configured to transmit an OFDM symbol having a predetermined guard interval length and a predetermined effective symbol length, to a partner communication apparatus as an OFDM signal, a reception unit configured to receive an OFDM signal that has been transmitted from the partner communication apparatus, a demodulation unit configured to carry out demodulation processing on the OFDM signal received by the reception unit in a period that does not include a symbol boundary of the received OFDM signal, and a setting unit configured to set a transmission timing of an OFDM signal by the transmission unit in at least one communication apparatus of the two communication apparatuses to a timing that precedes a symbol timing of the OFDM signal received by the reception unit by a predetermined time shorter than a round-trip transmission time of the OFDM signal in the bi-directional communication.

Further features of the present invention will become apparent from the following description of exemplary embodiments with reference to the attached drawings.

BRIEF DESCRIPTION OF THE DRAWINGS

FIG. 13 is a diagram illustrating a frequency assignment of OFDM signals according to the second embodiment.

FIG. 14 is a diagram illustrating a frequency assignment of OFDM signals according to the first embodiment.

DESCRIPTION OF THE EMBODIMENTS

Figure 8:
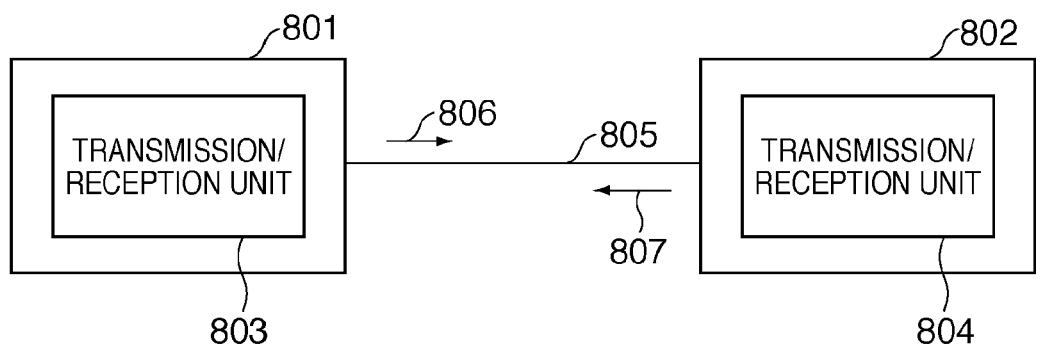
FIG. 8 is a block diagram showing a configuration example of a bi-directional communication system.

An OFDM signal bi-directional communication system as a preferred embodiment of the present invention is described below in detail with reference to the accompanying drawings. It should be noted that the system configuration of the present embodiment is the same as that shown in FIG. 8, and therefore description is given using same symbols.

First Embodiment

Figure 10:
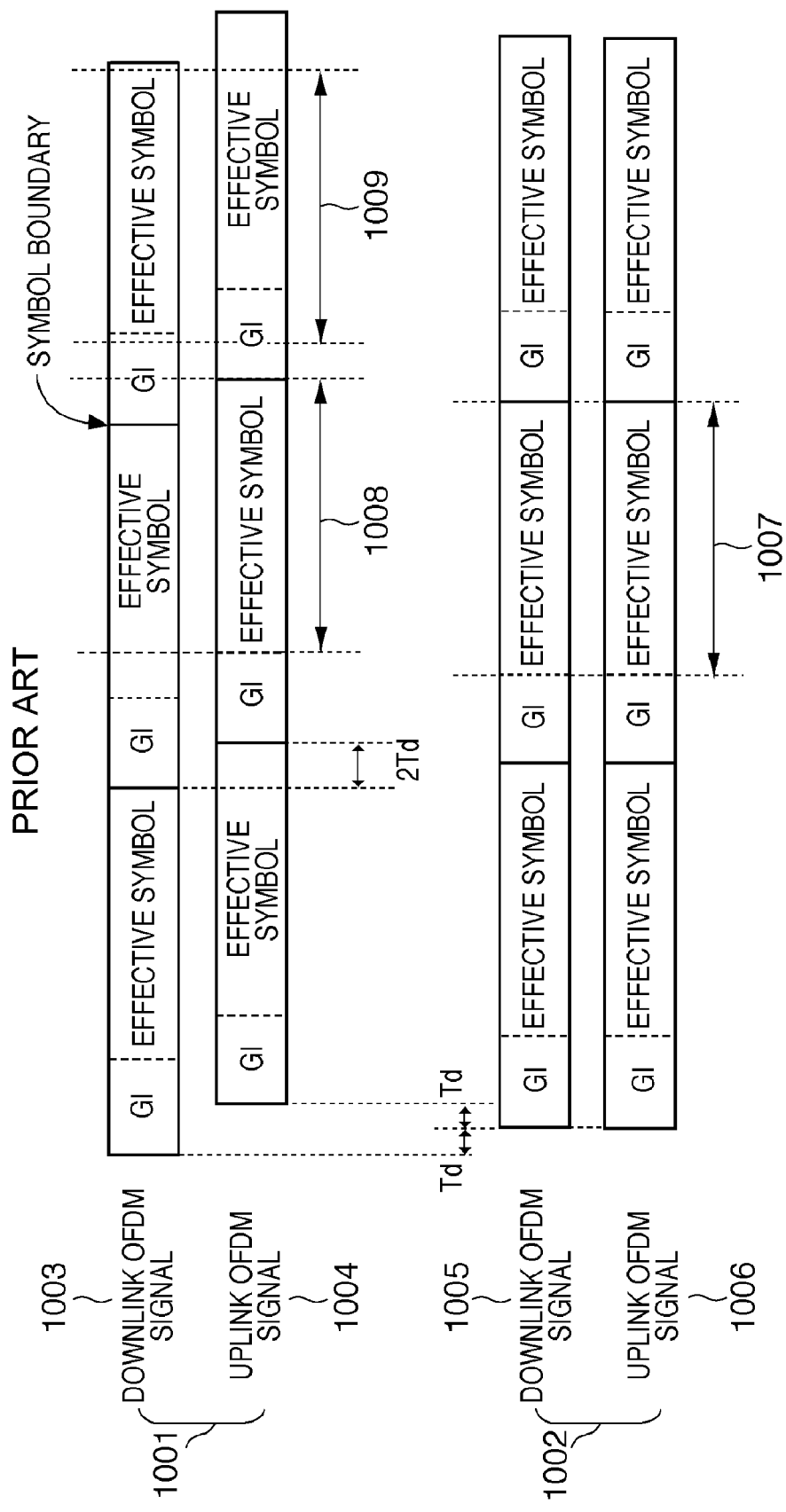
FIG. 10 is a diagram showing an assignment of received signal times in ordinary transmission/reception units 803 and 804.

In the bi-directional communication system shown in the present embodiment, a transmission time Td of signals between transmission/reception units 803 and 804 is measured. Then an OFDM signal, which is orthogonal to a received OFDM signal, is transmitted in an inverse direction with a timing preceding the symbol timing of the received OFDM signal by the transmission time Td. Further still, an effective symbol period of the transmitted OFDM signal is set as a period of demodulation processing. That is, the transmission/reception units 803 and 804 transmit OFDM signals in synchronization with each other such that the received signals of the transmission/reception units 803 and 804 undergo a time assignment as shown by numerals 201 and 202 in FIG. 2. And by setting the demodulation processing period to the periods shown by numerals 203 and 204 (an effective symbol period of OFDM signals to be transmitted), bi-directional communication is achieved without including a symbol boundary in the demodulation processing period and without producing interference. In this case, the period that functions as a GI among the signals received by the transmission/reception unit 803 is longer compared to conventional techniques (the interval between timing 1009 and timing 1008 in FIG. 10). On the other hand, the period that functions as a GI among the signals received by the transmission/reception unit 804 is shorter compared to conventional techniques (the timing of 1007 in FIG. 10). However, in a case where a same multipath resistance as conventional techniques is to be achieved, the guard interval length (GI length) can be set shorter compared to conventional techniques, and therefore it becomes possible to expand the bi-directional transmission bandwidth.

In an OFDM scheme, the GI is a redundant portion not used in demodulation, and the transmission bandwidth increases for shorter GI lengths. However, there is a tradeoff relationship between the transmission bandwidth and the multipath resistance in regard to the GI length. With conventional techniques, there are many portions in which the GI does not work as a GI in the received signals of the transmission/reception unit 803, and there is a problem that multipath resistance is reduced. In contrast to this, this issue is solved in the present embodiment, and the transmission timing is adjusted such that the period in which the GI is working as a GI is longer. That is, in a case where the GI lengths are equivalent, the multipath resistance is improved in the present embodiment compared to conventional techniques. And considered from an opposite angle, in a case of equivalent multipath resistance, the present embodiment better supports shorter GI lengths.

Hereinafter, using the block diagram in FIG. 1, description is given of a configuration and operation of the transmission/reception units 803 and 804 of communication apparatuses 801 and 802 according to the first embodiment.

First, description is given of an operation relating to transmission in the transmission/reception units 803 and 804.

Figure 1:
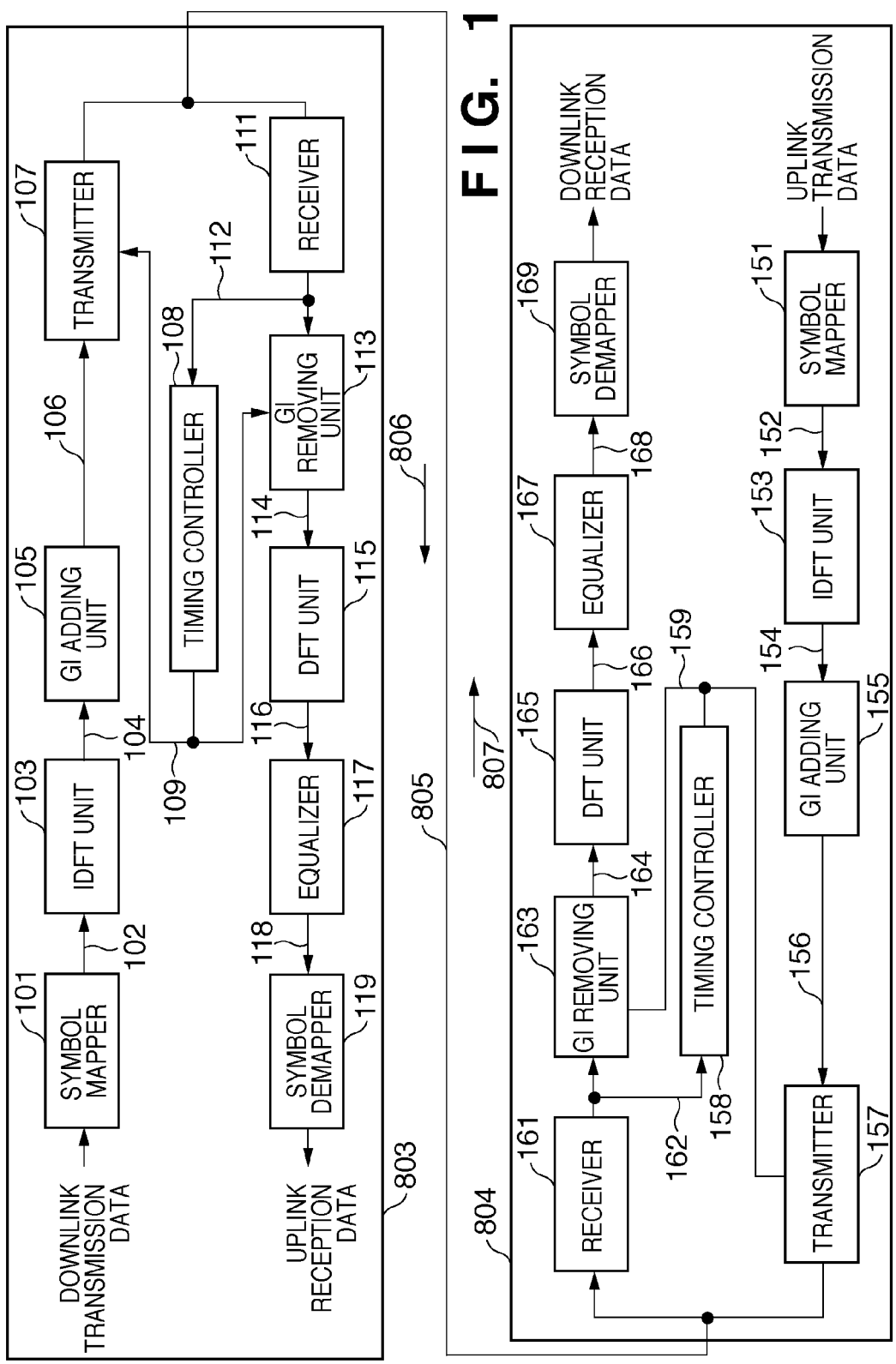
FIG. 1 is a block diagram showing a configuration example of transmission/reception units 803 and 804 according to a first embodiment.

In FIG. 1, a symbol mapper 101 of the transmission/reception unit 803 converts downlink transmission data to a downlink transmission complex symbol sequence 102 and outputs to an inverse discrete Fourier transform (hereinafter IDFT) unit 103. The IDFT unit 103 converts the transmission complex symbol sequence 102 to a time-axis signal and generates a downlink effective symbol 104. A GI adding unit 105 copies a predetermined period of a back portion of the downlink effective symbol 104, and generates a downlink OFDM symbol 106 by adding this as a GI to a front portion of the downlink effective symbol 104. In the OFDM symbol, the lengths of the guard interval length (GI length) and effective symbol length are determined in advance respectively. A transmitter 107 transmits the OFDM symbol, which has a predetermined guard interval length and a predetermined effective symbol length, to an external communication apparatus as an OFDM signal at a predetermined carrier frequency. An external communication apparatus refers to a partner communication apparatus in bi-directional communication. That is, the transmitter 107 performs D/A conversion processing, orthogonal modulation processing, and frequency conversion processing on the OFDM symbol 106, and transmits a downlink OFDM signal 806 of a predetermined frequency band on a transmission channel 805. Here, the transmitter 107 transmits the downlink OFDM symbol 106 in synchronization with a downlink timing signal 109 outputted by a timing controller 108.

Figure 9:
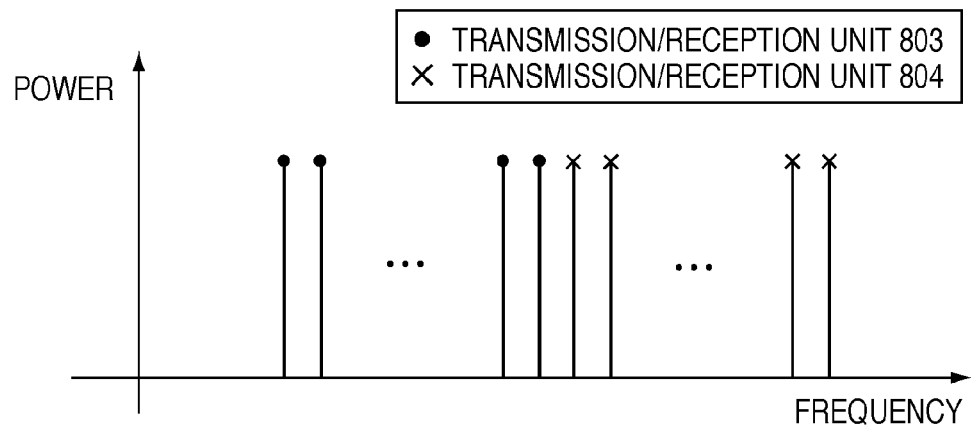
FIG. 9 is a diagram showing a frequency assignment of OFDM signals according to the first embodiment.

A symbol mapper 151, IDFT unit 153, GI adding unit 155, and transmitter 157 of the transmission/reception unit 804 operate in a same manner as the symbol mapper 101, IDFT unit 103, GI adding unit 105, and transmitter 107 of the transmission/reception unit 803. That is, in the transmission/reception unit 804, the uplink transmission data is converted to an uplink complex symbol sequence 152 by the symbol mapper 151, and the uplink complex symbol sequence 152 is converted to an uplink effective symbol 154 by the IDFT unit 153. Then, the uplink effective symbol 154 is converted to an uplink OFDM symbol 156 by the GI adding unit 155. The transmitter 157 transmits the uplink OFDM symbol 156 in synchronization with an uplink timing signal 159 outputted by a timing controller 158 as an uplink OFDM signal 807 on the transmission channel 805. However, the effective symbol and GI of the downlink OFDM symbol 106 and the uplink OFDM symbol 156 are generated so as to be a same length, and undergo frequency conversion processing by the transmitters 107 and 157 so that the frequency band of the downlink OFDM signal 806 and the uplink OFDM signal 807 are adjacent. As a result, the downlink OFDM signal 806 and the uplink OFDM signal 807 have a frequency assignment as shown in FIG. 9.

Next, description is given of an operation relating to reception in the transmission/reception units 803 and 804.

A receiver 111 of the transmission/reception unit 803 performs frequency conversion processing, orthogonal demodulation processing, and A/D conversion processing on the received signals, and outputs a received OFDM symbol 112 to the timing controller 108 and a GI removing unit 113. The GI removing unit 113 removes the GI from the received OFDM symbol 112 based on the downlink timing signal 109, and outputs a received effective symbol 114 to a discrete Fourier transform (hereinafter, DFT) unit 115. Here, the downlink timing signal 109 indicates a symbol timing of the downlink OFDM signal 806, and the GI removing unit 113 removes the GI period of the downlink OFDM signal 806 as the GI of the received symbol. That is, the effective symbol period of the downlink OFDM signal 806 in the received OFDM symbol 112 undergoes demodulation processing, and therefore the demodulation processing is carried out without including a symbol boundary of the downlink OFDM signal 806. It should be noted that although the effective symbol period of the downlink OFDM signal 806 undergoes demodulation processing in the present embodiment, the demodulation processing period is not limited to this as long as it is a period in which the symbol boundary is not included. That is, the GI removing unit 113 may be set to operate such that a period that is a predetermined period preceding the effective symbol period in the received OFDM symbol 112 is used as the demodulation processing period. The DFT unit 115, an equalizer 117, and a symbol demapper 119 carry out the demodulation processing. That is, the DFT unit 115 converts the received effective symbol 114 to a frequency-axis signal, and outputs a reception complex symbol sequence 116 to the equalizer 117. The equalizer 117 carries out equalization of transmission channel characteristics, and outputs an equalized complex symbol sequence 118 to the symbol demapper 119. The symbol demapper 119 converts the equalized complex symbol sequence 118 to uplink reception data.

A receiver 161, a GI removing unit 163, a DFT unit 165, an equalizer 167, and a symbol demapper 169 of the transmission/reception unit 804 operate in a same manner as the receiver 111, GI removing unit 113, DFT unit 115, equalizer 117, and symbol demapper 119 of the transmission/reception unit 803. That is, the receiver 161 converts received signals to a received OFDM symbol 162. The GI removing unit 163 converts the received OFDM symbol 162 to a received effective symbol 164. The DFT unit 165 converts the received effective symbol 164 to a complex symbol sequence 166. The equalizer 167 converts the complex symbol sequence 166 to an equalized complex symbol sequence 168. And the symbol demapper 169 converts the equalized complex symbol sequence 168 to downlink reception data.

Although described in detail later, the timing controllers 108 and 158 measure signal transmission times between partner communication apparatuses, and control the timing signals 109 and 159 in response to the measured transmission times.

Figure 3:
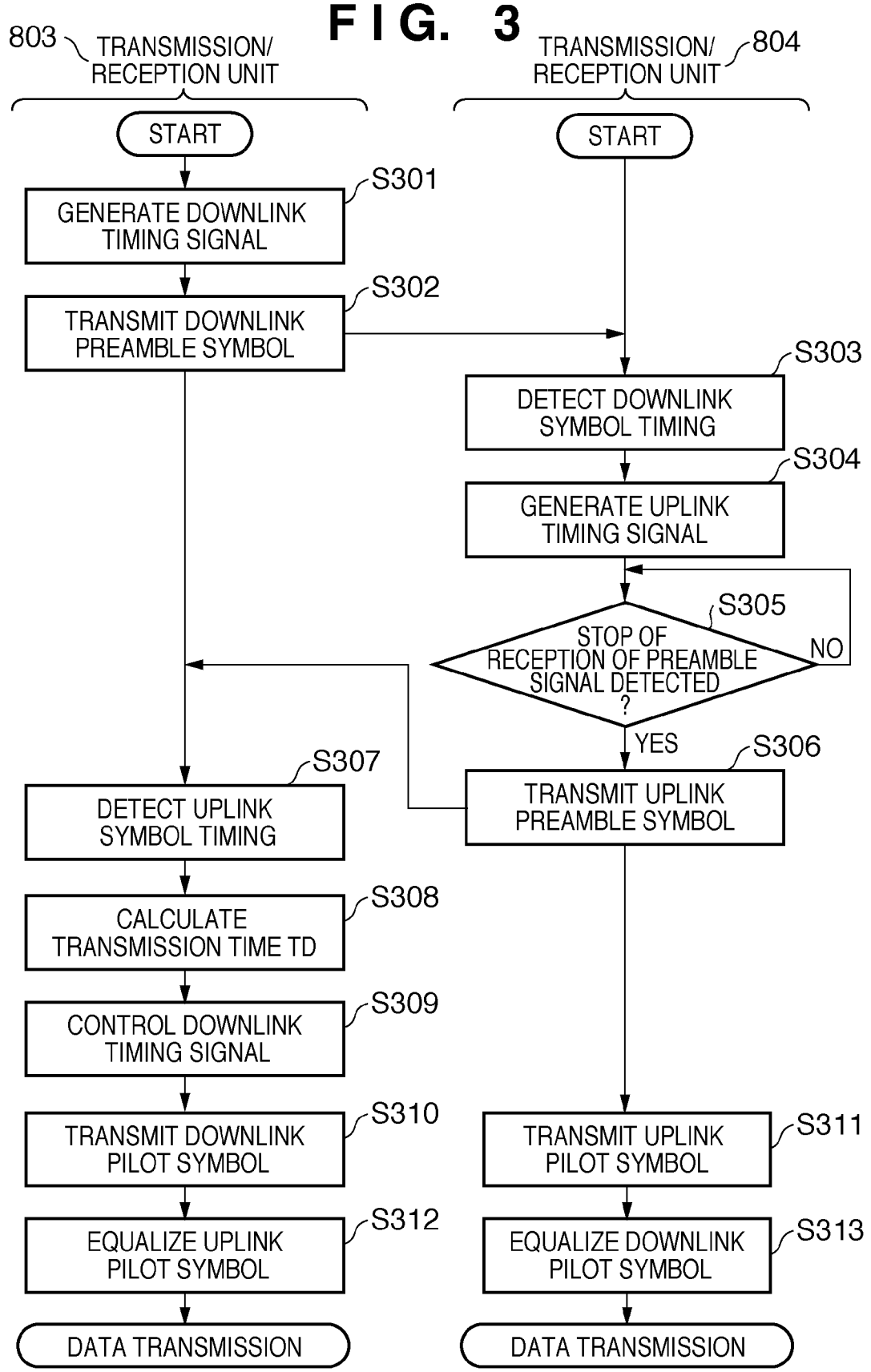
FIG. 3 is a flowchart for describing operation of the transmission/reception units 803 and 804 according to the first embodiment.
Figure 12:
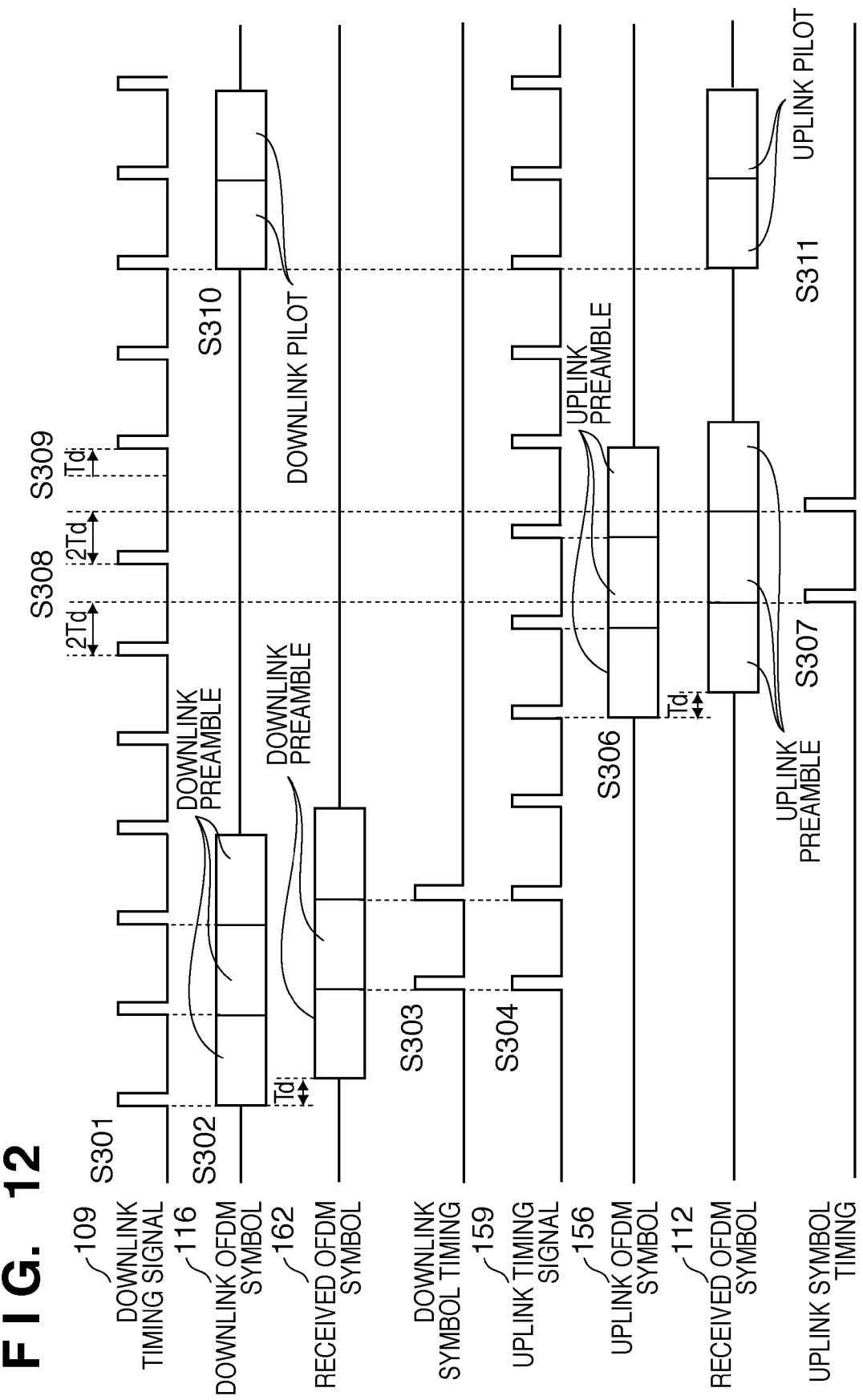
FIG. 12 is a diagram showing signal timings of each unit according to the first embodiment.

Description is given of operations of the transmission/reception units 803 and 804 according to the first embodiment using the flowchart of FIG. 3 and the timing chart of FIG. 12. FIG. 3 is a flowchart for describing operations of the transmission/reception units 803 and 804, and FIG. 12 is a timing chart showing signal timings of the units in each operational step.

After commencement of communication, the timing controller 108 of the transmission/reception unit 803 generates a downlink timing signal 109 having a same period as the OFDM symbol length (step S301). After this, the transmission/reception unit 803 transmits a predetermined number of downlink preamble symbols of a known pattern in synchronization with this downlink timing signal 109 (step S302). Here, the downlink timing signal 109 generated at step S301 is continuously generated in a same period even after the transmission of the downlink preamble signal has stopped. Also, the number of the downlink preamble symbols is set to a number sufficient to enable synchronization detection by the transmission/reception unit 804.

On the other hand, the timing controller 158 of the transmission/reception unit 804 detects a symbol timing from the downlink preamble signal that is received (step S303) and generates an uplink timing signal 159 that is in synchronization with this symbol timing (step S304). Then, after the stop of reception of the downlink preamble signal has been detected (step S305), a predetermined number of uplink preamble signals of a known pattern are transmitted in synchronization with the uplink timing signal 159 (step S306). It should be noted that the uplink timing signal 159 generated at step S304 is continuously generated in a same period even after the reception of the downlink preamble signal has stopped. Also, the number of the uplink preamble symbols is set to a number sufficient to enable synchronization detection by the transmission/reception unit 803.

Here, the uplink preamble symbol of the transmission/reception unit 804 is transmitted in synchronization with the downlink preamble symbol. Accordingly, the symbol timing of the uplink preamble received by the transmission/reception unit 803 is delayed from the downlink timing signal 109, which is the symbol timing of the downlink preamble symbol transmitted at step S302, by a round-trip transmission time 2Td. Taking advantage of this, the transmission/reception unit 803 detects the symbol timing of the uplink preamble signal (step S307), and calculates the transmission time Td from the delay time from the downlink timing signal (step S308). In this manner, the transmission times of the OFDM signals between the two communication apparatuses are measured, and the transmission time Td of the OFDM signal in one direction of the bi-directional communication is obtained. After this, the timing controller 108 generates a signal in which the downlink timing signal is delayed by the transmission time Td, and uses this as a new downlink timing signal (step S309). Due to this process, the transmission timing of the downlink OFDM signal is controlled to a timing that precedes the symbol timing of the received uplink OFDM signal by the transmission time Td.

As a result, the downlink timing signal 109 and the uplink timing signal 159 become in synchronization with each other. Accordingly, the transmission/reception units 803 and 804 transmit OFDM signals in synchronization with the downlink timing signal 109 and the uplink timing signal 159 respectively, thereby enabling bi-directional communication to be carried out using the signal time assignments shown for numerals 201 and 202 in FIG. 2. Furthermore, as a result of the operations of the GI removing units 113 and 163, the demodulation processing periods are set to periods shown for numerals 203 and 204 in FIG. 2, and demodulation can be carried out without including the symbol boundary and without interference. It should be noted that the transmission/reception units 803 and 804 transmit pilot symbols for transmission channel estimation (steps S310 and S311), and commence data transmission after settings relating to equalization processing are completed (steps S312 and S313).

Figure 4:
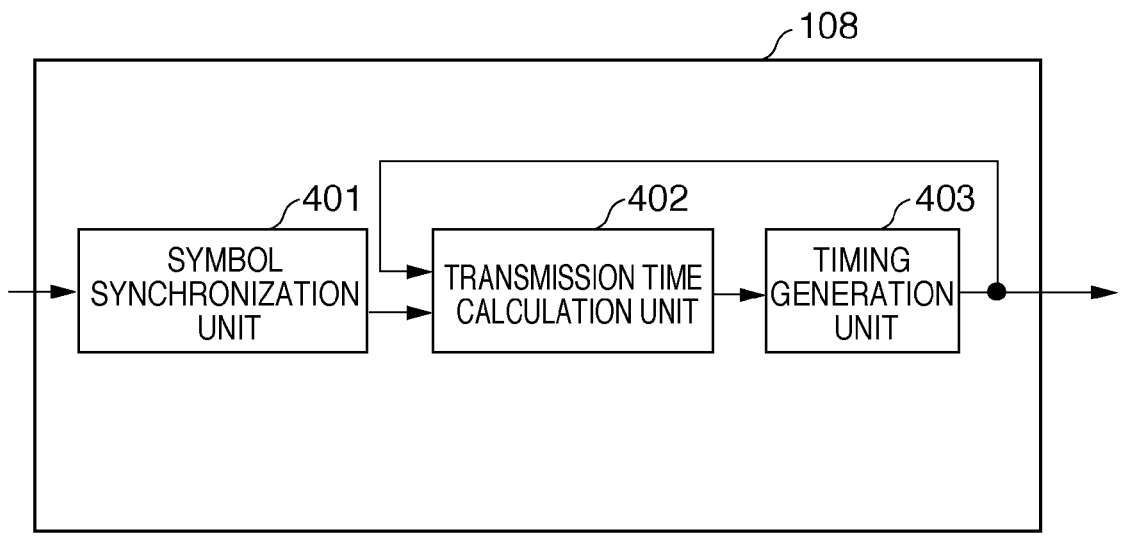
FIG. 4 is a block diagram showing a configuration example of a timing controller 108.
Figure 5:
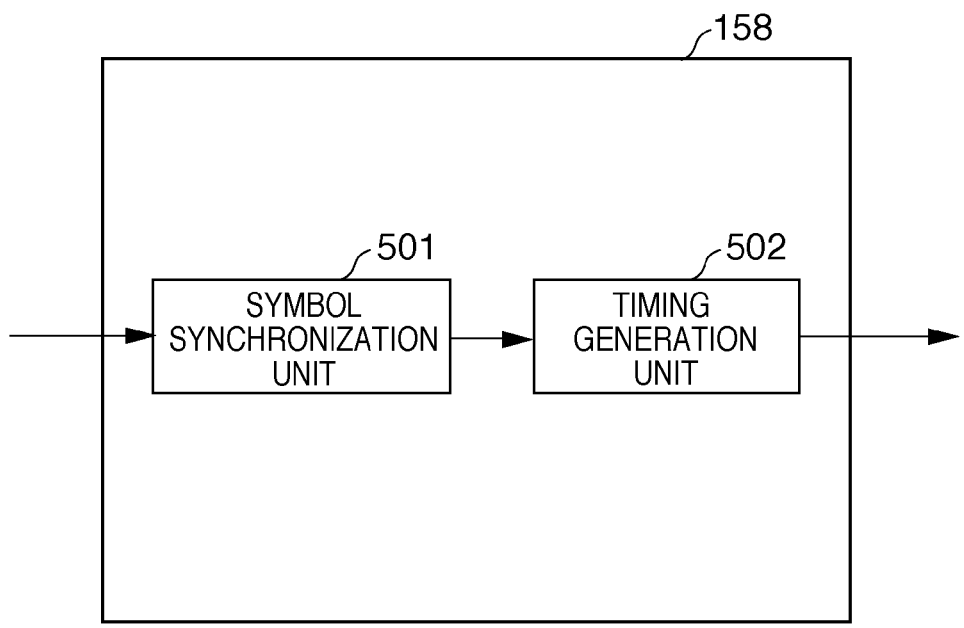
FIG. 5 is a block diagram showing a configuration example of a timing controller 158.

FIG. 4 and FIG. 5 are block diagrams showing configurations of the timing controllers 108 and 158 for carrying out the above-described timing control.

FIG. 4 is a block diagram showing a configuration example of the timing controller 108 of the transmission/reception unit 803. A timing generation unit 403 generates the downlink timing signal 109 at step S301. As described earlier, the downlink timing signal 109 continues to be generated in a same period even after transmission of the preamble signal is stopped, and the aforementioned downlink timing signal 109 is generated after calculation of the transmission time Td at step S309. A transmission time calculation unit 402 calculates a transmission time from a delay time difference between the uplink symbol timing and the downlink timing signal at step S308. At step S307, a symbol synchronization unit 401 carries out detection of the uplink symbol timing using a correlation operation with a known pattern.

FIG. 5 is a block diagram of the timing controller 158 of the transmission/reception unit 804. At step S303, a symbol synchronization unit 501 carries out detection of the downlink symbol timing using a correlation operation with a known pattern. At step S304, a timing generation unit 502 generates the uplink timing signal 159 in synchronization with the downlink symbol timing, and continues generating this even after reception of the downlink preamble signal has stopped.

Figure 2:
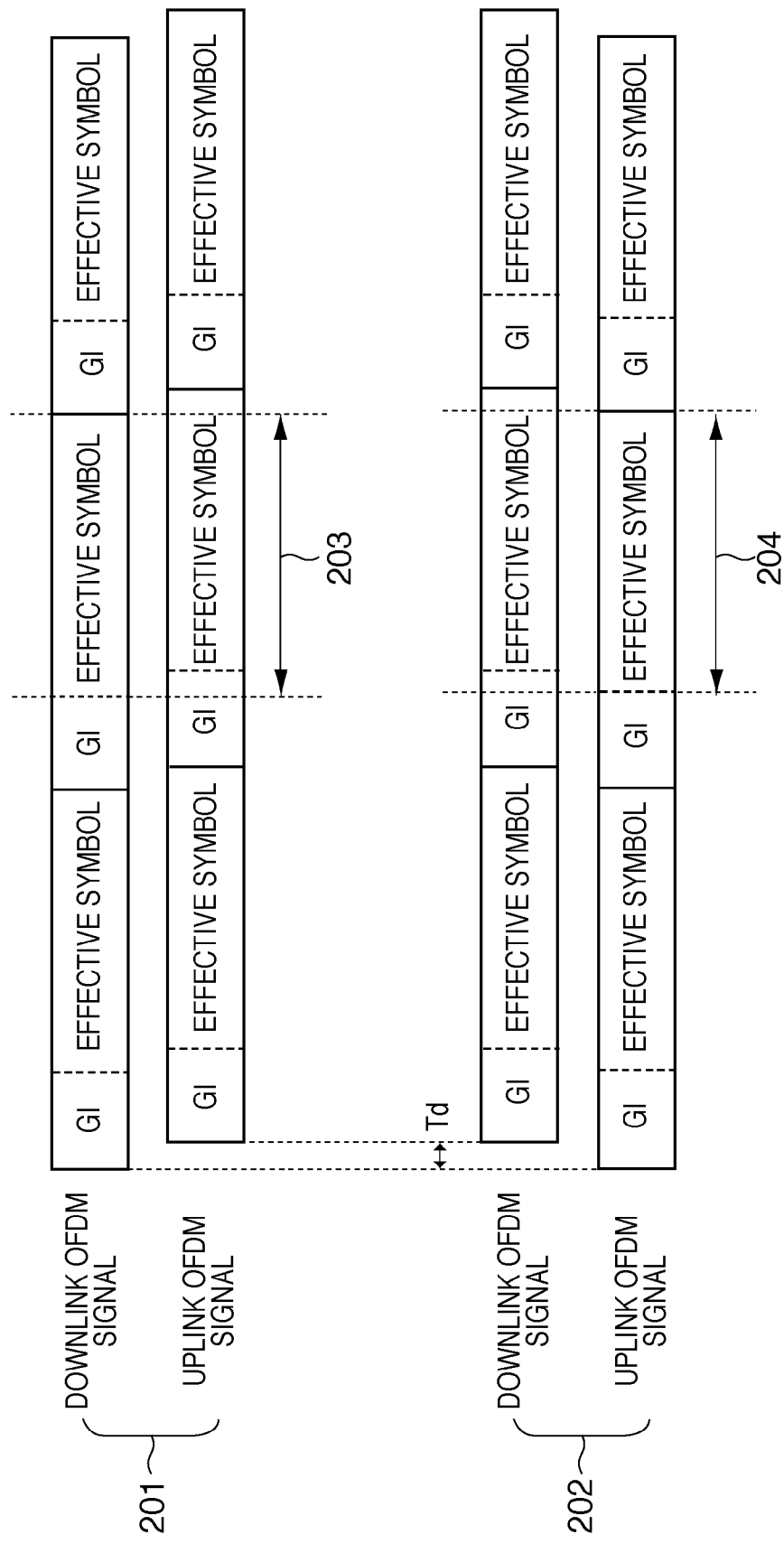
FIG. 2 is a diagram showing an assignment of received signal times in the transmission/reception units 803 and 804.

As a result of the operations of these units, the OFDM signals transmitted and received by the transmission/reception units 803 and 804 undergo the time assignment as shown in FIG. 2, and demodulation processing can be performed without including the symbol boundary. Accordingly, bi-directional communication can be carried out without causing interference in a case where frequency bandwidths are assigned adjacent to each other. Furthermore, in a case where a same multipath resistance as conventional techniques is to be achieved, the GI length can be set shorter compared to conventional techniques, and therefore it becomes possible to expand the bi-directional transmission bandwidth.

Description was given in the present embodiment of transmission timing control being carried out by the transmission/reception unit 803, but there is no limitation to this. For example, naturally a same effect as the present embodiment can be achieved by giving notification to the transmission/reception unit 804 of the transmission time calculated by the transmission/reception unit 803, then having the transmission/reception unit 804 carry out control of transmission timing.

Furthermore, description was given using an example of a case where the transmission/reception units 803 and 804 carry out bi-directional communication using orthogonal sub-carriers in adjacent bandwidths as shown in FIG. 9, but there is no limitation to this in the present embodiment. For example, naturally any sub-carrier arrangement can be applied as long as the sub-carriers are orthogonal. That is, as shown in FIG. 14 for example, bi-directional communication may be carried out with the sub-carriers arranged alternately.

Description was given that the transmission/reception units 803 and 804 perform control such that the symbol timing of the transmitted OFDM signals was a timing that preceded the symbol timing of the received OFDM signals by the transmission time Td, but the present invention is not limited to this. For example, the transmission/reception unit 804 may perform control such that the symbol timing of the transmitted OFDM signal is a timing that precedes the symbol timing of the received OFDM signal by an arbitrary time T. Naturally, however, an effect of the present invention is greatest in a case where T=Td. Furthermore, in a case where T≧2Td, the symbol boundary is included during the demodulation processing period in the transmission/reception unit 803, and interference occurs. That is, a point of the present embodiment is that in at least one communication apparatus of two communication apparatuses, the transmission timing (symbol timing) of the transmitted OFDM signal is controlled to a timing that precedes the symbol timing of the received OFDM signal by a predetermined time. However, it is necessary that this predetermined time is a time shorter than a total (2Td) of transmission times of OFDM signals in both directions in the bi-directional communication.

Second Embodiment

Figure 11:
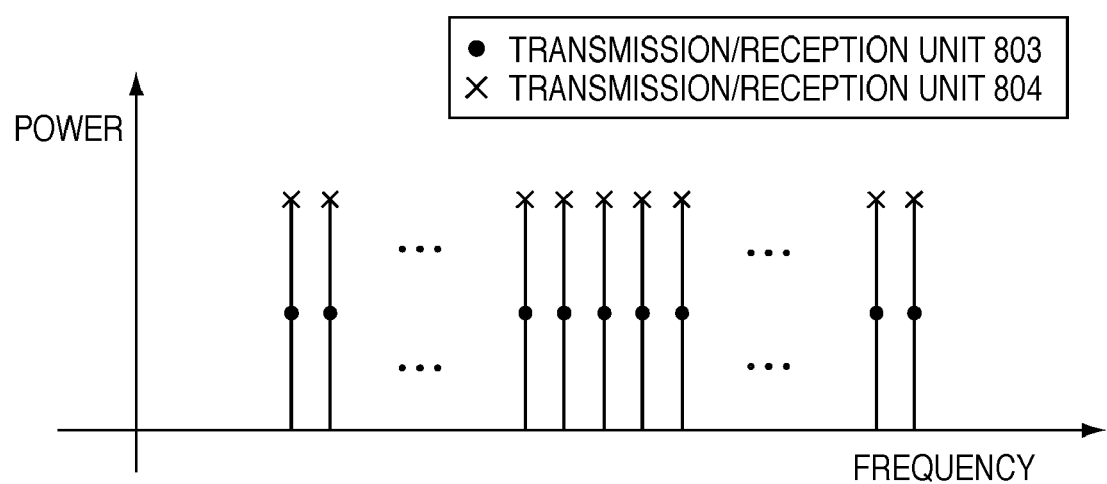
FIG. 11 is a diagram showing a frequency assignment of OFDM signals according to the second embodiment.

In a second embodiment, the transmission/reception units 803 and 804 carry out bi-directional communication using OFDM signals of a same frequency band without assigning frequency bandwidths adjacent to each other. That is, as shown in FIG. 11, the transmission/reception units 803 and 804 transmit OFDM signals having a same sub-carrier arrangement. Then, the transmission/reception units 803 and 804 carry out demodulation processing by carrying out a correction process by subtracting signal components respectively transmitted by the transmission/reception units 803 and 804 themselves during demodulation to extract only desired signal components.

Hereinafter description is given of a configuration and operation of transmission/reception units 803 and 804 according to the second embodiment, but since the control method of transmission timings and demodulation processing periods are the same as the foregoing embodiment, description thereof is omitted.

Figure 6:
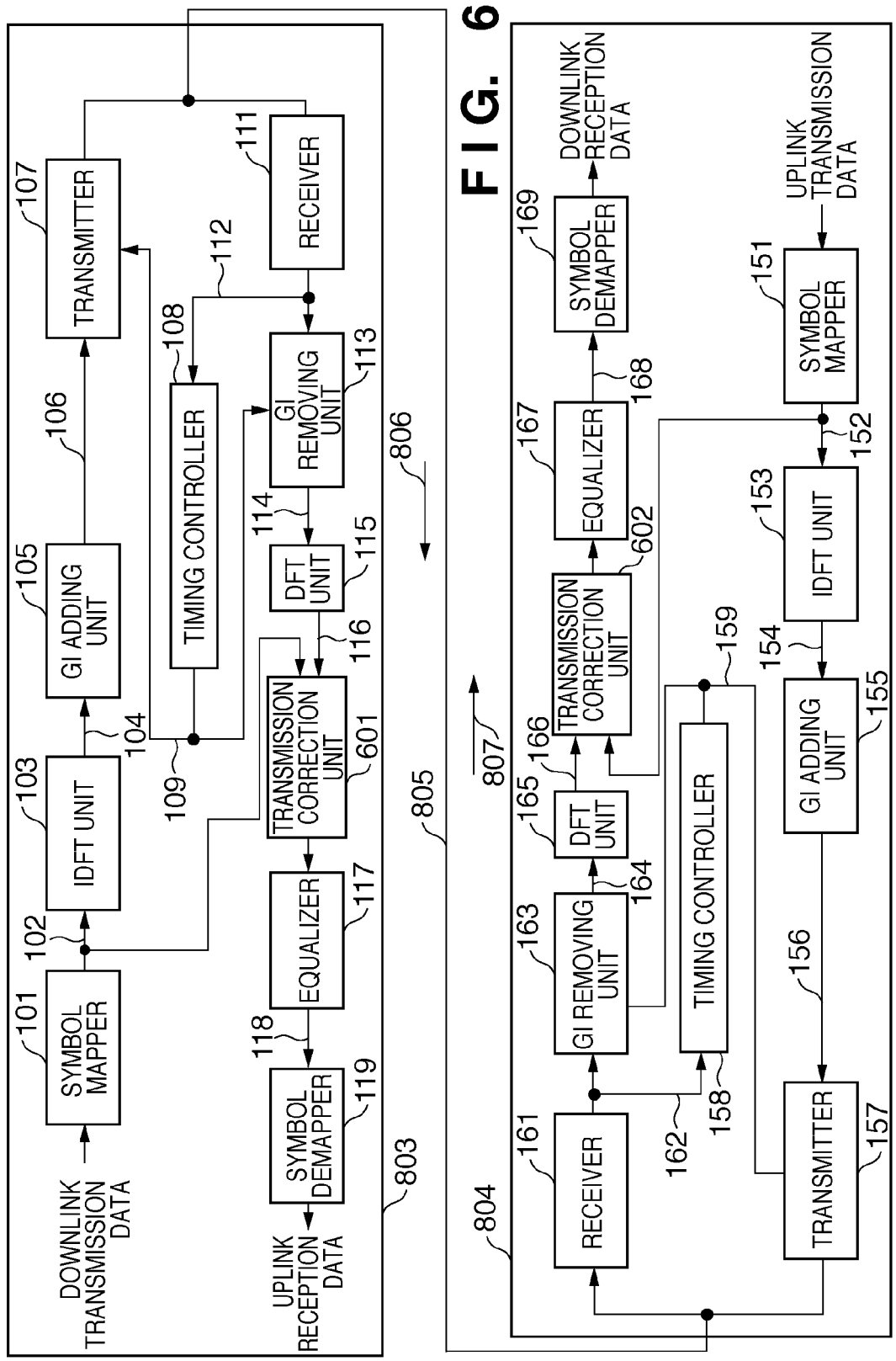
FIG. 6 is a block diagram showing a configuration example of the transmission/reception units 803 and 804 according to a second embodiment.

FIG. 6 is a block diagram showing configurations of the transmission/reception units 803 and 804. Identical symbols are assigned to blocks identical to FIG. 1 and detailed description thereof is omitted. The second embodiment is different from the first embodiment in that transmission correction units 601 and 602 are added, and in that the transmitters 107 and 157 perform frequency conversion on the downlink OFDM symbol 106 and the uplink OFDM symbol 156 to a same-center frequency. Based on the transmission complex symbol sequences 102 and 152 outputted from the symbol mappers 101 and 151, the transmission correction units 601 and 602 carry out a correction process involving subtraction on the reception complex symbol sequences 116 and 166. In other words, the transmission correction units 601 and 602 extract only desired reception signals by performing correction by subtracting signal components transmitted respectively by the transmission/reception units 803 and 804 themselves from reception signals on the frequency axis (frequency range). However, in this correction process involving subtraction, the transmission channel characteristics (hereinafter referred to as "feedback characteristics") from the transmitter 107 to the receiver 111 and from the transmitter 157 to the receiver 161 are estimated, and an influence of these transmission channel characteristics is added to the transmission complex symbol sequences 102 and 152. In this manner, it is necessary to carry out subtraction processing from the reception complex symbol sequences 116 and 166 using the transmission complex symbol sequences 102 and 152 in which feedback characteristics have been taken into account.

Figure 7:
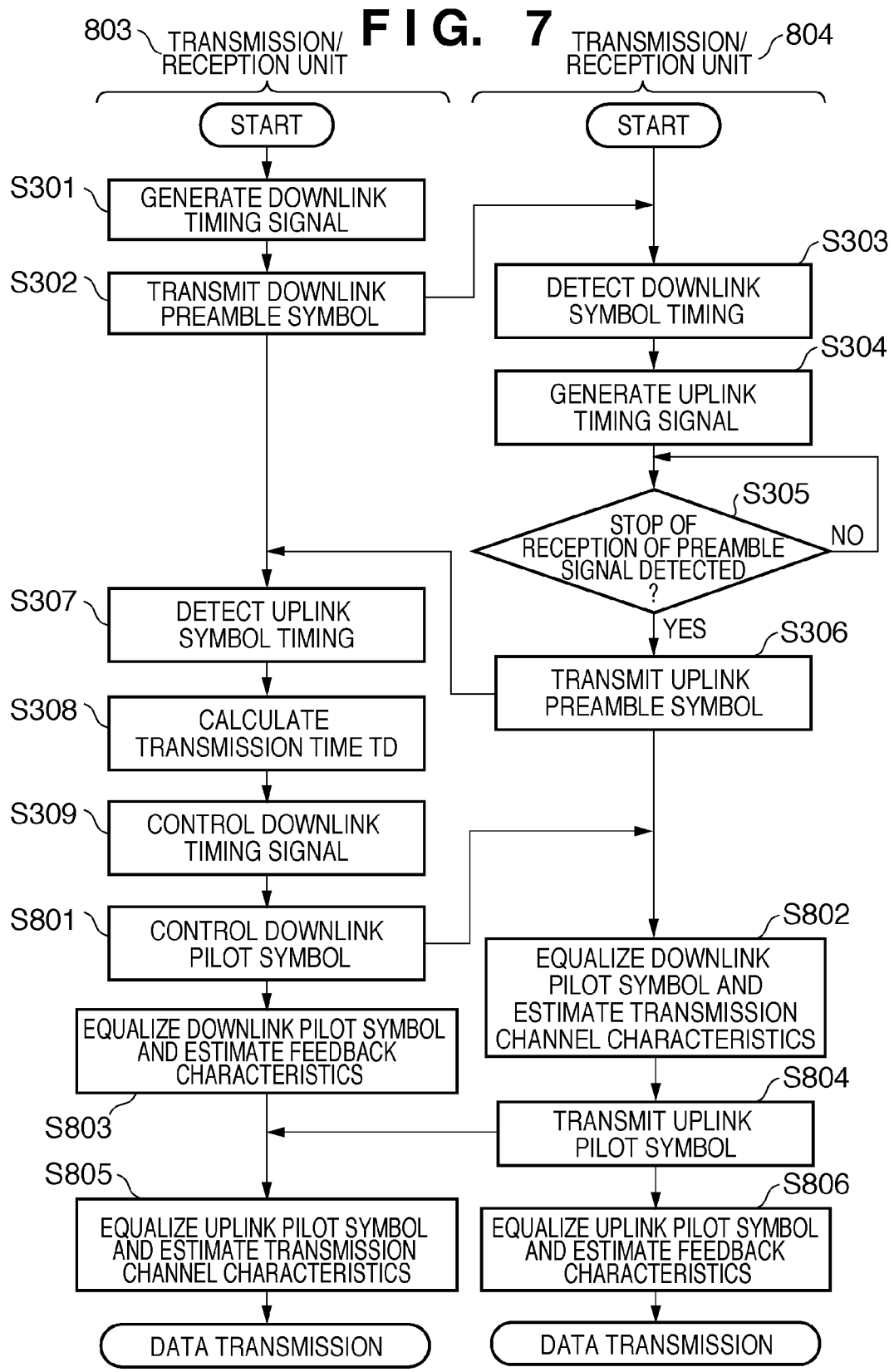
FIG. 7 is a flowchart for describing operation of the transmission/reception units 803 and 804 according to the second embodiment.

FIG. 7 shows a flowchart for describing operations according to the present embodiment. It should be noted that identical symbols are assigned to steps identical to FIG. 3, which shows an operational flow according to the first embodiment, and detailed description thereof is omitted. Transmission control of pilot symbols is different from the first embodiment. After completion of timing control (step S309), the transmission/reception unit 803 transmits a downlink pilot symbol for estimating the transmission channel (S801). Here, in addition to being used in estimating characteristics of the transmission channel 805 in the transmission/reception unit 804 (step S802), the downlink pilot symbol is used in estimating feedback characteristics in the transmission/reception unit 803 (step S803). After this, the transmission/reception unit 804 transmits an uplink pilot symbol (step S804), then the transmission/reception unit 803 carries out character estimation of the transmission channel 805 (step S805), and the transmission/reception unit 804 carries out estimation of the feedback characteristics (step S806). Thereafter, data transmission is carried out based on estimated values of the transmission channel characteristics obtained in steps S801 to S805.

With the above-described operation, bi-directional communication can be achieved using OFDM signals having a same sub-carrier arrangement. That is, compared to the first embodiment, the frequency bandwidth used by the transmission/reception units 803 and 804 is increased in the second embodiment, and it is possible to expand the bi-directional transmission bandwidth.

It should be noted that description of the second embodiment was given that the transmission/reception units 803 and 804 transmitted and received OFDM signals having a same sub-carrier arrangement, but the present invention is applicable as long as the GI length and the effective signal length, and the center frequency of the uplink OFDM signal and the downlink OFDM signal are the same. That is, the present invention is applicable even if only the transmission/reception unit 803 or the transmission/reception unit 804 transmits a specific sub-carrier, and also if the sub-carriers of the OFDM signals transmitted by the transmission/reception units 803 and 804 are partially overlapping as shown in FIG. 13. As described above, a configuration can be used for carrying out bi-directional communication by causing sub-carrier frequencies of OFDM signals transmitted by the transmitter of a communication apparatus to completely or partially match with sub-carrier frequencies of the OFDM signals transmitted by a partner communication apparatus thereof.

As described above, with the foregoing embodiments, a bi-directional communication system can be achieved in which occurrences of interference are eliminated and that has a high efficiency in frequency usage. Thus, it becomes possible to expand the bi-directional transmission bandwidth.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-257789, filed Oct. 2, 2008, which is hereby incorporated by reference herein in its entirety.

What is claimed is:

1. A bi-directional communication system that carries out bi-directional communication using OFDM signals,
    wherein each of two communication apparatuses comprise:
    a transmission unit configured to transmit an OFDM symbol having a predetermined guard interval length and a predetermined effective symbol length, to a partner communication apparatus as an OFDM signal,
    a reception unit configured to receive an OFDM signal that has been transmitted from the partner communication apparatus,
    a demodulation unit configured to carry out demodulation processing on the OFDM signal received by the reception unit in a period that does not include a symbol boundary of the received OFDM signal, and
    a setting unit configured to set a transmission timing of an OFDM signal by the transmission unit in at least one communication apparatus of the two communication apparatuses to a timing that precedes a symbol timing of the OFDM signal received by the reception unit by a predetermined time shorter than a round-trip transmission time of the OFDM signal in the bi-directional communication.

2. The system according to claim 1,
    wherein the one communication apparatus further comprises:
    a measurement unit configured to measure transmission times of OFDM signals between the two communication apparatuses to obtain a transmission time of an OFDM signal in one direction of the bi-directional communication, and wherein the setting unit sets a transmission timing of an OFDM signal by the transmission unit to a timing that precedes a symbol timing of the OFDM signal received by the reception unit by a time equivalent to the transmission time in one direction obtained by the measurement unit.

3. The system according to claim 1, wherein the demodulation unit carries out demodulation processing of the OFDM signal received by the reception unit in an effective symbol period of an OFDM signal transmitted by the transmission unit.

4. The system according to claim 1, wherein the transmission unit transmits an OFDM signal using a sub-carrier frequency orthogonal to a sub-carrier frequency of an OFDM signal transmitted by the partner communication apparatus.

5. The system according to claim 1, wherein the transmission unit performs transmission by causing sub-carrier frequencies of OFDM signals transmitted by the partner communication apparatus to completely or partially match with sub-carrier frequencies of OFDM signals transmitted by the transmission unit, and the demodulation unit carries out subtraction correction in which a signal component of OFDM signals transmitted by the transmission unit are subtracted in a frequency range from the received OFDM signals, and carries out the demodulation processing on OFDM signals that have undergone subtraction correction.

6. The system according to claim 1, wherein the demodulation unit uses an effective symbol period of an OFDM signal transmitted from the partner communication apparatus as a period of the demodulation processing.

7. A communication apparatus that carries out bi-directional communication of OFDM signals between an external communication apparatus, comprising:

a transmission unit configured to transmit to a partner communication apparatus as an OFDM signal at a predetermined carrier frequency an OFDM symbol having a guard interval length determined in advance and an effective symbol length determined in advance, a reception unit configured to receive an OFDM signal that has been transmitted by the transmission unit of the partner communication apparatus, a demodulation unit configured to carry out demodulation processing on the OFDM signal received by the reception unit in a period that does not include a symbol boundary of the received OFDM signal, and a setting unit configured to set a transmission timing of an OFDM signal by the transmission unit to a timing that precedes a symbol timing of the OFDM signal received by the reception unit by a predetermined time shorter than a round-trip transmission time of the OFDM signal in the bi-directional communication.

8. A control method of a communication apparatus that carries out bi-directional communication using OFDM signals, comprising:

a transmission step of transmitting an OFDM symbol having a predetermined guard interval length and a predetermined effective symbol length, to a partner communication apparatus as an OFDM signal, a reception step of receiving an OFDM signal that has been transmitted from the partner communication apparatus, a demodulation step of carrying out demodulation processing on the OFDM signal received in the reception step in a period that does not include a symbol boundary of the received OFDM signal, and a setting step of setting a transmission timing of an OFDM signal in the transmission step to a timing that precedes a symbol timing of the OFDM signal received in the reception step by a predetermined time shorter than a round-trip transmission time of the OFDM signal in the bi-directional communication.

9. A computer-readable storage medium on which is stored a program for executing on a computer the control method of a communication apparatus according to claim 8.

* * * * *